April 12, 1966  P. J. ALLSOPP  3,246,235
APPARATUS FOR OXYGEN ANALYSIS OF GASES
Filed Dec. 27, 1961  5 Sheets-Sheet 2
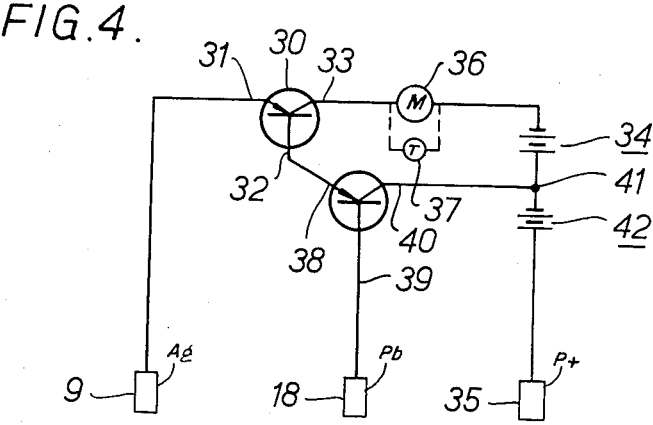
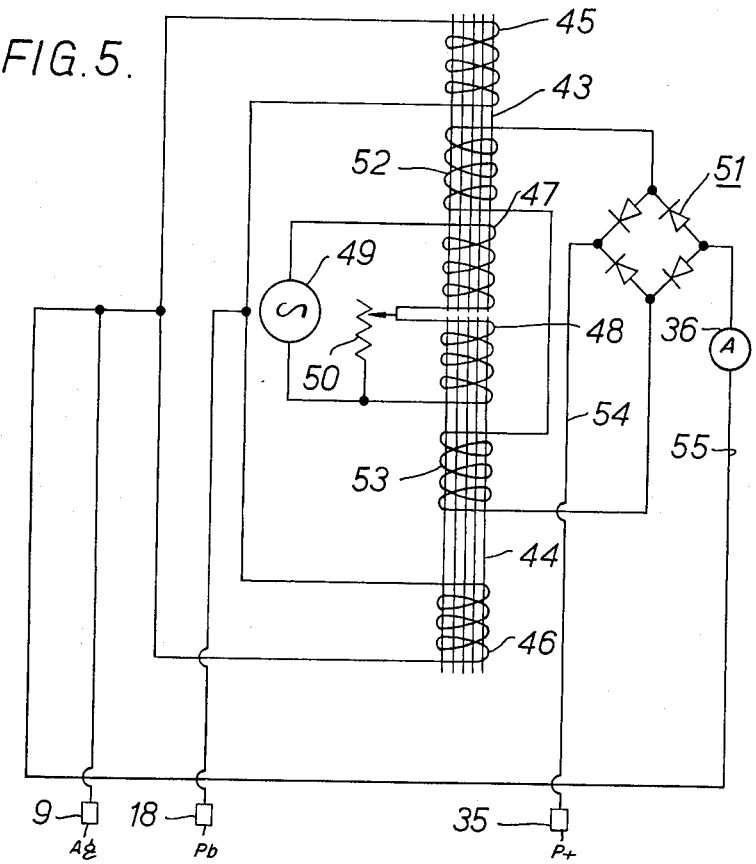

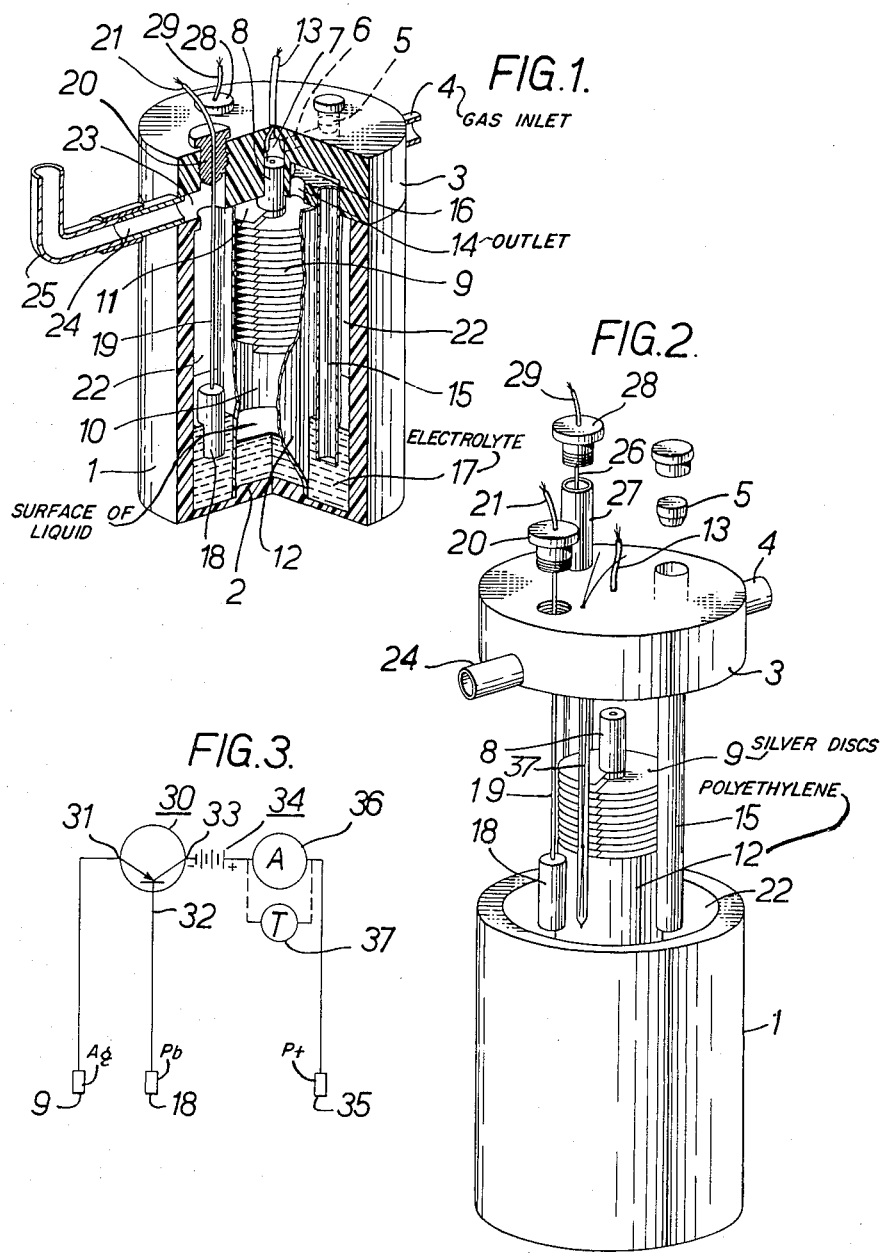

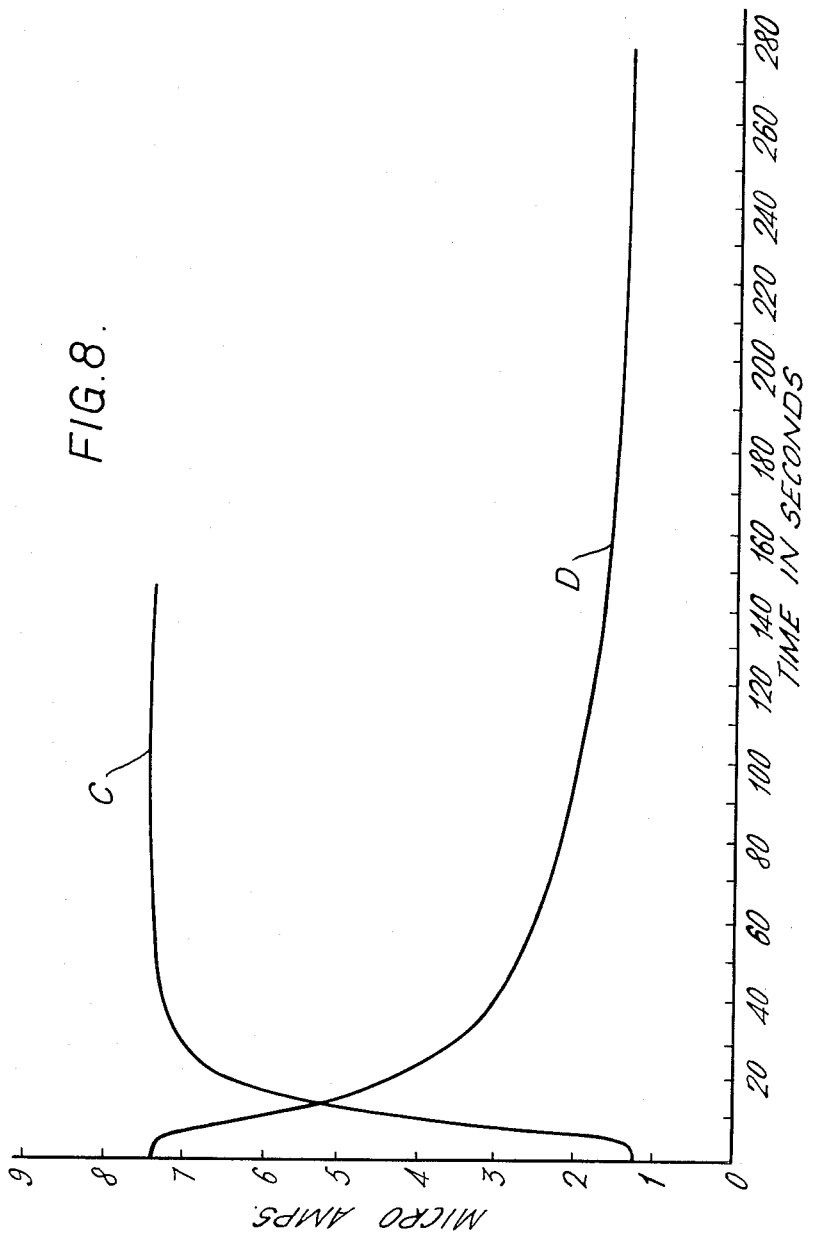

United States Patent Office 3,246,235
Patented Apr. 12, 1966

3,246,235
APPARATUS FOR OXYGEN ANALYSIS OF GASES
Peter James Allsopp, Reading, England, assignor to United Kingdom Atomic Authority, London, England
Filed Dec. 27, 1961, Ser. No. 162,543
Claims priority, application Great Britain, Dec. 30, 1960, 44,756/60
7 Claims. (Cl. 324—29)

This invention relates to electrical devices employing galvanic cells and it is particularly concerned with electrical devices for the detection or estimation of oxygen in other gases.

The detection or estimation of oxygen in other gases by the use of a galcanic cell in which the oxygen is absorbed at one electrode and produces current which is a function of the oxygen concentration, has been practised for some years and has achieved some industrial success.

A cell of this type is disclosed in U.S. Patent 2,805,191.

The electrochemical processes occurring in such galvanic cells are complex and it is not necessary to enter into a detailed consideration of the theory of these processes. It appears to be clear, however, that oxygen in the gas being tested is absorbed on the surface of the silver electrode and migrates to the three phase boundary where it is reduced partly to hydroxyl ion and partly to hydroxyperoxyl ion. The corresponding process at the other electrode is oxidation of the electrode material and the net result is the development of an electro-motive force between the two electrodes, which electro-motive force is a function of the concentration of the oxygen in the gases to be tested.

The nature of the electrolyte and the electrode is dependent primarily upon the nature of the gases containing oxygen. It is apparent that the electrolyte should not enter into chemical action with the gases. Thus for example an alkaline electrolyte would not be used with acidic gases and conversely an acidic electrolyte would not be used with alkaline gases. Neutral electrolytes can be used but for most purposes it has been found that strongly alkaline electrolytes are particularly satisfactory. With all electrolytes, suitable electrodes of precious metal include silver, silver-plated nickel, gold, gold-plated nickel, iridium-plated nickel, and platinum. In some instances nickel, although not normally considered a precious metal, is a suitable electrode material and therefore the term "precious metal" should be understood to include nickel.

Suitable materials for alkaline electrolytes include potassium hydroxide, sodium hydroxide, sodium and potassium carbonates and sodium and potassium bicarbonate. Dilute sulphuric acid is suitable for use as an acidic electrolyte and an alkali metal chloride solution may be used as neutral electrolytes.

Suitable materials for use as electrode of base metal include cadmium, lead, antimony, arsenic, antimony amalgam, and lead amalgam with alkaline electrolytes. Copper may be used with acidic and neutral electrolytes.

The relationship between the electrical output of the cell and the oxygen concentration is not entirely linear and above a certain maximum, which is dependent primarily upon the geometry of the cell and the area of electrode in contact with the gases, the electrical output does not increase with increasing oxygen content.

It has been found that such cells suffer from certain characteristic disadvantages among which are included a delayed response to variations in oxygen level in gases being tested, and in the case of cells with liquid electrolytes, fluctuations in electrical output due to fluctuations in electrode area exposed to the gases. In the case of cells in which the electrolyte is wholly absorbed within a porous material, resulting in the presence of no free liquid, there is the difficulty of preventing the cell from drying up. Furthermore, if efforts are made to saturate with moisture the gases to be tested, this causes an increase in the pressure required to drive the gases through the testing apparatus and restricts the freedom of use of the cell. As a final difficulty found with such known cells, may be mentioned adding fresh electrolyte to such cells, for the electrolyte normally contains dissolved oxygen, even distilled water contains an undesirably high proportion of oxygen, and the oxygen destroys the accuracy of the calibration curve. Up to 16 hours may be required to remove the effect of adding only a few millilitres of distilled water.

In the specification of the copending U.S. patent application having S.N. 91,945 and filed February 27, 1961, by the present applicant, now abandoned, there is described an apparatus which substantially solves the above-mentioned difficulties. The specification describes and claims a galvanic cell for the detection or estimation of oxygen in other gases, of the type having a liquid electrolyte, which comprises an electrode of precious metal having a substantial area in the path of gases to be tested, a barrier of material permeable to the electrolyte, said barrier being in contact with the electrode or precious metal and being capable of maintaining a film of electrolyte in contact with a portion of the said electrode, a reservoir for maintaining liquid electrolyte in contact with said barrier, and an electrode of base metal dipping into said reservoir, the base metal being of a type which is attacked significantly by the electrolyte only when the oxygen is absorbed at the electrode of precious metal to produce electrical current.

The barrier must consist of a material which allows passage of the electrolyte in an unchanged state. Suitable materials include inert porous ceramic materials, filter paper and the like, but a preferred material is an inert porous plastic material for example porous polyethylene.

There are, however, certain difficulties associated with such cells which have not been solved by the abovementioned pieces of apparatus.

One difficulty appears to be fundamental to those cells and has the effect of limiting the operational life. It will be recalled that one electrode, the base metal, of the cell is attacked by the electrolyte in the presence of oxygen. A reaction of the metal is necessary if current is to flow and it is therefore inseparable from the action of the cell. The electrolyte becomes depleted and must be replaced or regenerated. The lifetime of the electrolyte depends of course on the oxygen level of the gases being tested but it is somewhere between a few hours in the worst cases and up to two weeks in the best cases in practice.

Another undesirable feature of the known cells is their tendency to drift, thereby rendering it necessary to re-calibrate at frequent intervals. In some instruments which are available commercially it is recommended that the instrument be calibrated immediately before and after test readings are taken.

A third undesirable feature is a consequence of the sensitivity of the instrument. The cells discussed above are suitable for measuring oxygen in the range up to about 100–200 v.p.m. (volume parts per million), and are upset if they are exposed to gases containing large proportions of oxygen. If, for example, they are exposed to air (about 200,000 v.p.m. oxygen) they lose their sensitivity and the electrolyte becomes contaminated with a large quantity of base metal.

An object of this invention is to provide a cell for the estimation of oxygen in gases, which has an extremely long operational life.

A further object of the invention is to provide such a cell having a very small tendency to drift.

A third object of the invention is to provide such a cell which is resistant to swamping by large quantities of oxygen.

The invention consists in an electrical cell for the detection or estimation of oxygen in other gases, which comprises first, second and third electrodes, means for maintaining an electrolyte in contact with the said electrodes, the first and third electrodes being composed of a material which is not attacked by the electrolyte in either the presence or absence of oxygen, and the second electrode being composed of a base metal readily attacked by the electrolyte in the presence of oxygen but not significantly attacked in the absence of oxygen, a conduit for leading gas containing oxygen to the first electrode, a portion of the said first electrode being exposed to the said gas, electrical connections between the first and third electrodes, connections for an electrical source at a potential appropriate to the electrochemical system of the cell adapted to apply a D.C. potential difference between the first and third electrodes, the third electrode being subjected to the positive potential when the source is connected thereto, electrical connections between the first and second electrodes, and current controller means for controlling electrical current between the first and second electrodes as a small proportion of electrical current between the first and third electrodes, the total current being a function of the oxygen concentration in the gas being tested.

By means of the invention, the electrical current is divided between two loops and no longer passes as a whole through the base metal electrode. This results in the quantity of base metal passing into solution as a result of attack by the electrolyte being greatly reduced. It is surprising that the stability of the calibration is also increased and likewise that the cell can withstand swamping by large quantities of oxygen.

The nature of the current controller means is obviously of vital importance. A n-p-n transistor has been found to be satisfactory. The emitter is connected to the first electrode, the base is connected to the second electrode and the collector is connected to the third electrode via the D.C. source, e.g., via a battery. Examination of this system will reveal that the first and second electrodes apply forward bias to the emitter-base junction and reverse bias to the base-collector junction, as required for the operation of the transistor. Two or more transistors could be used, their connections being made so as to multiply their gains.

An n-p-n transistor would be impracticable in such a system. The potentials of the three electrodes in the cell are such that the first electrode is positive across the electrical connections with respect to the second electrode and it would therefore need to be connected to the base of the transistor. Since the base connections of a transistor cannot carry the main current, this being carried by the emitter-collector circuit, whereas the first electrode must carry the main current, there is a conflict which cannot be simply resolved.

A magnetic amplifier having a common connection between the control winding and the load circuit, as described hereinafter, is suitable for use as a current controller.

In such a system the first and second electrodes are in the control winding circuit, the positive side of the rectified A.C. load circuit is connected to the third electrode and the negative side is connected to the first electrode.

The third electrode is preferably composed of an inert metal such as platinum or nickel. It is important that it should not be attacked by the electrolyte.

Embodiments of the invention are illustrated in the accompanying drawings in which:

FIGURE 1 is a cut-away perspective drawing;

FIGURE 2 is an exploded view;

FIGURE 3 is a circuit diagram incorporating a transistor;

FIGURE 4 is a circuit diagram showing the use of two transistors;

FIGURE 5 is a circuit diagram incorporating a magnetic amplifier;

FIGURE 8 shows response curves.

Figure 6:
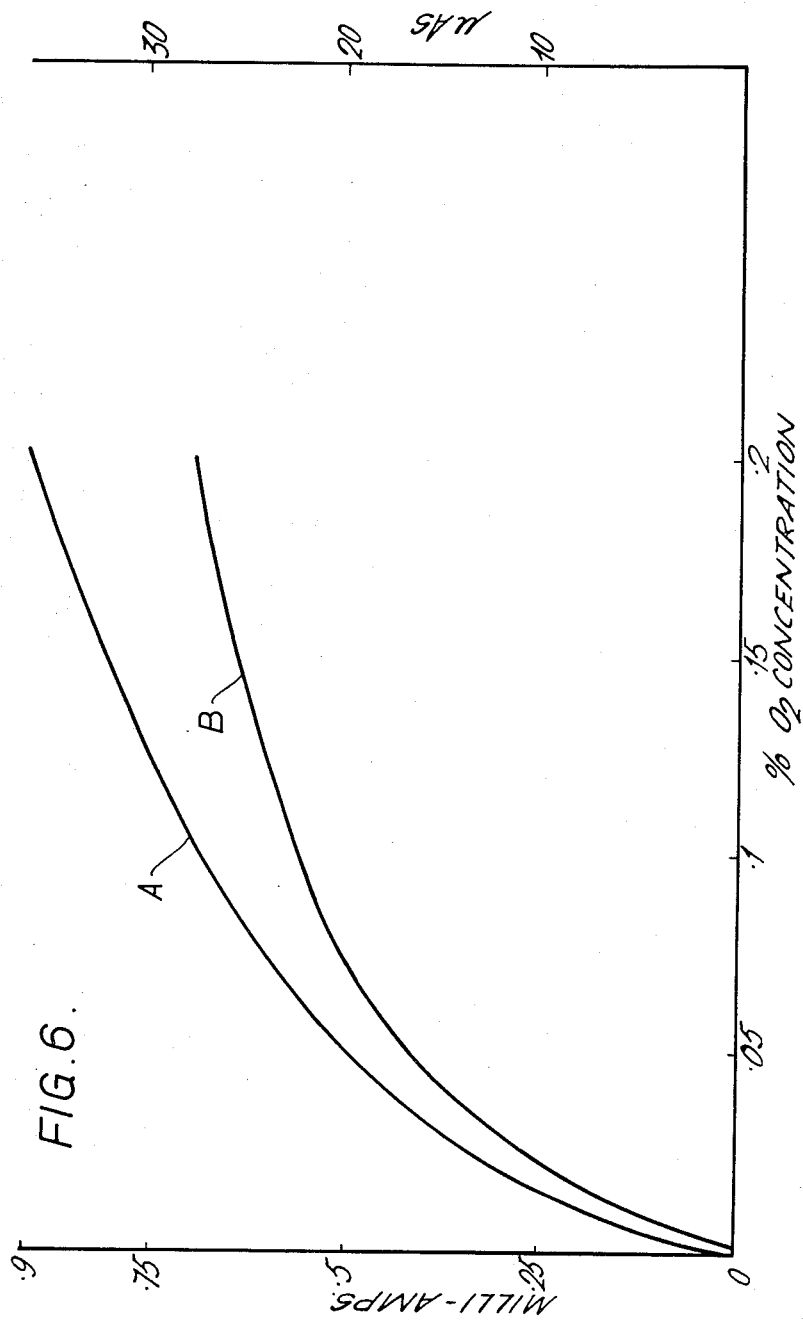
FIGURE 6 is a graphical representation showing the relationship of the electrical currents to the second and third electrodes in a particular case.

In FIGURES 1 and 2 a cylindrical container 1 of moulded resin has a raised centre portion 2. A lid 3 of the same moulded resin material has a gas inlet passage 4 which branches upwards via a non-return valve 5 to a passage 6 which communicates with a space 7 above a silver tube 8 threaded to receive silver discs 9 forming an electrode. The discs 9 are split radially so that when threaded onto the silver tube 8 they open out at the radial split and can be brought into contact with each other so as to co-operate to form a helical passage which provides communication between space 10 and space 11. These spaces lie inside a tube 12 composed of porous polyethylene. The tube at its lower end fits closely on raised centre portion 2 and at its upper end fits closely about, and in good contact with, the silver discs 9. The tube 12 therefore dips into the electrolyte 17 and a film of the electrolyte is maintained in contact with the silver discs 9. A wire 13, forming electrical contact with the silver discs by soldering, is brought out through the lid 3.

Space 11 has an outlet 14 formed as a passage in the lid 3, the outlet communicating with a bubbler tube 15 via passage 16, tube 15 dipping into electrolyte 17.

An electrode of lead 18 mounted on a thin rod 19 dips into the electrolyte 17. Rod 19 is fixed in and supported by a moulded resin screw 20 and is connected to a wire 21 brought out through the screw.

An annular space 22 above the electrolyte has an outlet 23 in lid 3 communicating with extension piece 24 and tube 25.

An electrode 35 of platinum (not shown in FIGURE 2 but indicated in FIGURE 3) supported on a thin rod 26 is enclosed in a removable container 27 of porous polyethylene dipping into the electrolyte 17. A moulded resin screw 28 supports rod 26 and within the screw 28 a wire 29 makes contact with rod 26. A thermistor 37 is provided to compensate for small changes in temperature of electrolyte 17.

In FIGURE 3 a p-n-p transistor 30 has its emitter 31 connected to silver electrode 9, its base 32 connected to lead electrode 18 and its collector 33 connected to the negative side of a 9 v. battery 34. The positive side of the battery 34 is connected to platinum electrode 35 via an ammeter 36. The thermistor 37 is connected across ammeter 36 to compensate for small changes in temperature.

When the cell is in operation, gas enters via inlet 4, passes through non-return valve 5, and along passage 6 into space 7. From there it passes down the inside of tube 8 into space 10, upwards along the helical path formed by discs 9 and into space 11. It leaves this space by outlet 14, passes along passage 16 and then travels downwards within bubbler tube 15 to bubble through the electrolyte 17 into annular space 22. It then passes out of the cell via outlet 23 and extension piece 24.

The gas passing over the silver electrode 9 generates current I which passes to the emitter 31 of the transistor. The galvanic cell in combination with the battery sets up the necessary operating circuit for the transistor and we can write the usual transistor current relationships:

(a) $$I_e = I_b + I_c$$

where $I_b$ is the base current, and $I_c$ is the collector current, (b) $$I_b = \frac{1}{1+\beta} \cdot I_e$$

where $\beta$ is the gain of the transistor, and (c) $$I_c = \frac{\beta}{1+\beta} \cdot I_e$$

$I_b$ is also the current to the lead electrode and, since $\beta$ is usually large, is a small proportion of the current passing through the silver electrode and therefore the attack on the lead by the electrolyte is reduced proportionately. The main part of the current generated at the silver electrode passes to the platinum electrode as shown by relationship (c) above, and is measured by the ammeter 36.

In FIGURE 4, numbers have the same significance as in FIGURE 3. The base 32 is connected to the emitter 38 of a second transistor, the base 39 of which is connected to the lead electrode 18. The collector 40 is connected to a tapping 41 between battery 34 and battery 42, the positive side of which is connected to platinum electrode 35.

In FIGURE 5, which is schematic to the extent that resistors have been omitted for simplicity, two magnetic cores 43 and 44 have balanced control windings 45 and 46 connected to silver electrode 9 and lead electrode 18. Supplementary balancing windings 47 and 48 have an A.C. source 49 and fine balance leak resistance 50.

A bridge rectifier 51 has windings 52 and 53 round cores 43 and 44 connected to opposite corners. An electrical connection 54 connects platinum electrode 35 to the positive corner of the bridge rectifier 51 and an electrical connection 55 connects silver electrode 9 to the negative corner of the bridge rectifier 51 via an ammeter 36.

In operation, the A.C. source energises both magnetic cores equally, fine adjustment being obtained by the leak resistance 50. No output appears across the bridge rectifier so long as the cores are balanced. When a current flows round windings 45 and 46 due to electrodes 9 and 18, the cores are unbalanced and an output appears across the bridge rectifier. This output is amplified and a larger current flows between the silver electrode 9 and the platinum electrode 35, the total current being a function of the oxygen content of the gases in contact with the silver electrode.

In particular embodiment of the invention, using a transistor, the cell inlet was a tube of internal diameter ⅛″, and the electrolyte was 10% KOH having a depth of ¾″. The bubbler dipped ½″ into the electrolyte.

To test this embodiment, oxygen was obtained by electrolysis of 10% KOH in an electrolytic cell, the hydrogen being allowed to escape to atmosphere. The amount of oxygen produced was proportional to the electrolysis current. The oxygen was generated directly in a stream of argon gas which had itself been de-oxygenated over heated manganous oxide pellets. After the passage of air, the cell was purged with argon at 250 cc./min. for 30 minutes, this being adequate to restore the correct characteristics. The results obtained are shown in Table I, the times indicating the total time on air:

The cell was then modified by removal of the transistor and the battery, and calibrated afresh. After calibration the cell was run on air for 20 hours. It was noticeable that severe lead corrosion occurred and that the readings had drifted badly. The readings are given in Table II:

Table II

| Oxygen injected, V.P.M. | Calibration, micro-amps | After 20 hours on air, micro-amps |
|---|---|---|
| 0 | 8 | 9 |
| 10 | 34 | 24 |
| 20 | 55 | 36 |
| 30 | 73 | 50 |
| 40 | 84 | 61 |
| 50 | 93 | 72 |

Further tests were carried out using the cell with the transistor connected. FIGURE 6 shows the results obtained. Curve A represents the current flowing in the connections to the platinum electrode, the scale being on the left of the drawing, and curve B shows the current flowing in the connection to the lead electrode, the scale being on the right of the drawing. At 0.05% $O_2$, for example, the current to the platinum electrode is 0.49 milliamp, that is, 490 micro-amps, and the current to the lead electrode is 16.6 micro-amps. The life of the electrolyte is thus increased by a factor of about 490/16, that is, about 30. This is with a single transistor. With two such transistors the life would be increased by a factor of about $30^2$.

In cells not of the invention the electrolyte becomes contaminated by the lead compounds and this adversely influence the sensitivity of the cell, requiring recalibration of the cell after only a small mass throughput of oxygen. In the cell of the invention, on the contrary, the composition of the electrolyte remains substantially constant and therefore recalibration is not required until a very large amount of the lead electrode has been consumed as a consequence of the functioning of the cell.

Figure 7:
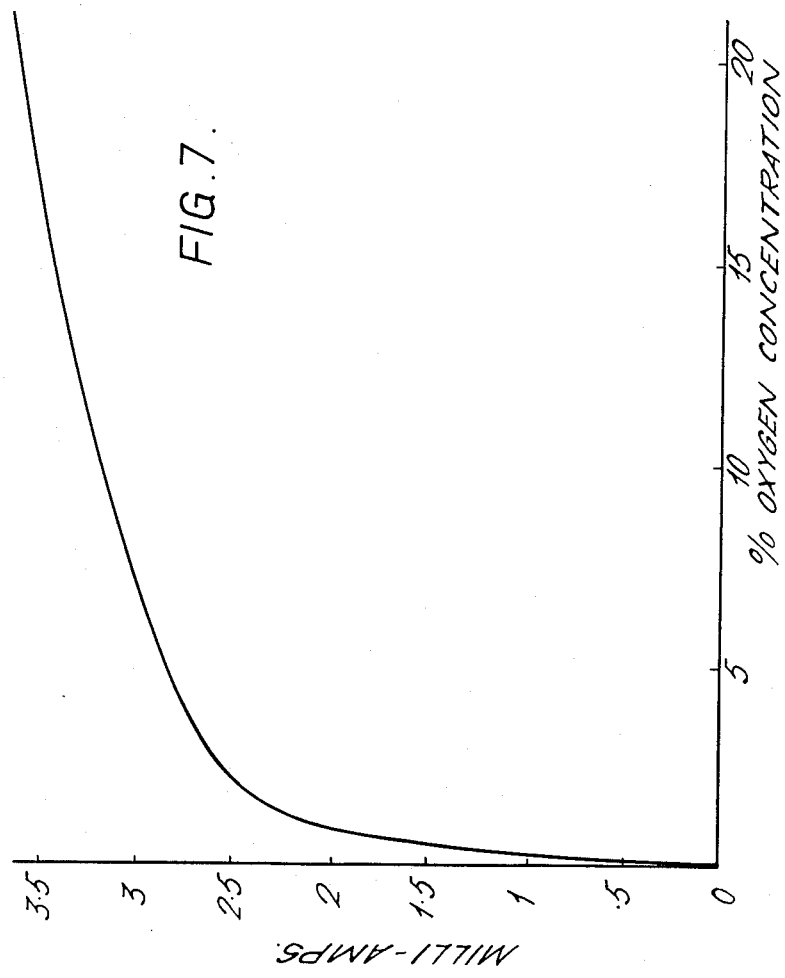
FIGURE 7 is a typical calibration curve.

In FIGURE 7 the curve shows the ammeter 36 reading for from 0 to 20% oxygen. It can be seen that the cell has an enormous range.

The response time of the system is very good. FIGURE 8 shows the response for an increase (curve C) and for a decrease (curve D). It can be seen that for an increase, the instrument reponds immediately and the change is 90% complete after 20 seconds. For a decrease the response is slower, a 90% change taking 100 seconds, that is 1 minute, 40 seconds.

It should be borne in mind that transistors allow the passage of leakage currents and these should be taken into account when setting zero readings.

Another point to bear in mind is that the platinum electrode may become coated to some extent with lead oxide which will set up a back E.M.F. up to about 1½ volts. In the circuits shown this is immaterial since the base-collector junction and the rectifier bridge act as blocking diodes.

Table I

| Oxygen injected, V.P.M. | Reading on ammeter micro-amps | | | | | |
|---|---|---|---|---|---|---|
| | Fresh electrolyte | After 16 hour argon purge | After 3½ hours on air | After 12½ hours on air | After 39½ hours on air | After 104½ hours on air |
| 0 | 15 | 14 | 13 | 13 | 14 | 13 |
| 10 | 46 | 42 | 39 | 39 | 39 | 39 |
| 20 | 69 | 61 | 60 | 61 | 60 | 59 |
| 30 | 86 | 73 | 76 | 78 | 80 | 75 |
| 40 | 100 | 86 | 90 | 90 | 98 | 88 |
| 50 | 110 | 98 | 100 | 102 | 110 | 100 |

I claim:
1. Apparatus capable of detecting and measuring the presence of small amounts of uncombined oxygen in gases, comprising in combination an electrolyte in a container having inlet and outlet means to accommodate a flow of the said gas through the said container, in the said container a first electrode in contact with the said electrolyte and having a substantial part of its area external to the said electrolyte, said first electrode being composed of a material which is not attacked by the electrolyte in the presence or absence of the said gas flow, a conduit for leading the said gas flow over the said first electrode, a current controller means connected on one side to the first electrode by a connection external to the electrolyte and on the other side to a second electrode in contact with the said electrolyte by a connection external to the electrolyte and on the other side to a second electrode in contact with the said electrolyte by a connection external to the said electrolyte so that it completes an electric circuit between the said first and second electrodes, the second electrode being composed of a material which is readily attacked by the electrolyte when the said first electrode is exposed to the said gas flow whereby the said first and second electrodes form a galvanic cell but is not readily attacked when the said first electrode is not exposed to the said gas flow, a D.C. source means having its negative side connected to the current controller by a connection external to the said electrolyte and its positive side connected by a connection external to the said electrolyte to a third electrode in contact with the said electrolyte, the said D.C. source means holding the said third electrode as an anode with respect to the first electrode, the said current controller means being capable of dividing the current generated by the said galvanic cell into two parts, one of which is a small proportion of the total current and passes between the said first and second electrodes and the other part of which passes between the said first and third electrodes, and electrical measuring means for measuring the current generated by the said galvanic cell.

2. The electrical device as claimed in claim 1 in which the current controller means is a p-n-p transistor having its emitter connected to the first electrode, its base connected to the second electrode, and its collector connected to the negative side of a D.C. source means.

3. The electrical device as claimed in claim 1 in which the D.C. source means is a battery.

4. The electrical device as claimed in claim 1 in which the current controller means includes a magnetic amplifier having the first and second electrodes in its control winding circuit, the positive side of its rectified A.C. load circuit being connected to the third electrode and the negative side being connected to the first electrode.

5. An electrical device as claimed in claim 1 in which the third electrode is composed of a metal inert to the electrolyte and to oxygen.

6. An electrical device as claimed in claim 1 in which the third electrode is composed of one of platinum and nickel.

7. An electrical device as claimed in claim 1 in which the current controller means is two p-n-p transistors, the first of said transistors having its base connected to the second electrode, its collector connected to the negative side of the said D.C. source means and its emitter connected to the base of the second of said transistors, which second transistor has its emitter connected to the first electrode and its collector connected to the negative side of a second D.C. source means whose positive side is connected to the collector of the first of said transistors.

References Cited by the Examiner
UNITED STATES PATENTS
2,803,191   9/1957   Hersch _____ 204—1

WALTER L. CARLSON, *Primary Examiner.*

FREDERICK M. STRADER, *Examiner.*

C. F. ROBERTS, *Assistant Examiners.*